Figure 1:
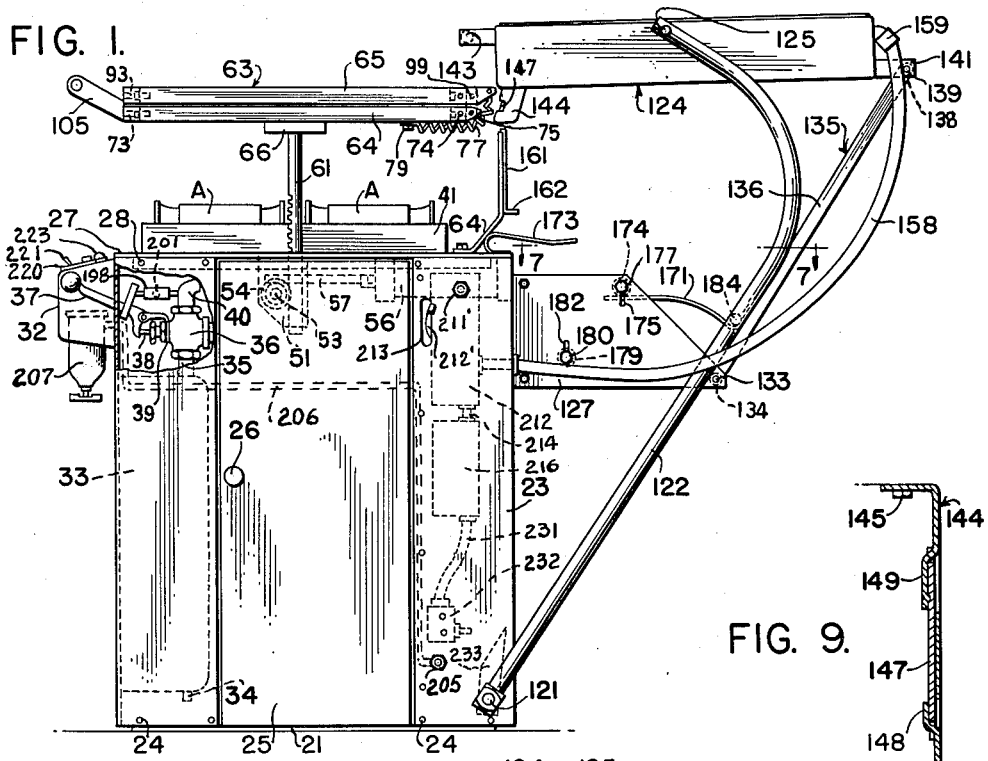

May 19, 1964

M. M. ARNOULD ETAL 3,133,314

PLASTIC SHEET VACUUM FORMING MACHINE

Filed March 17, 1961

6 Sheets-Sheet 1

INVENTORS
MARCEL M. ARNOULD
BOLESLAW L. BUDZYN

*L. S. Saulsbury*

ATTORNEY

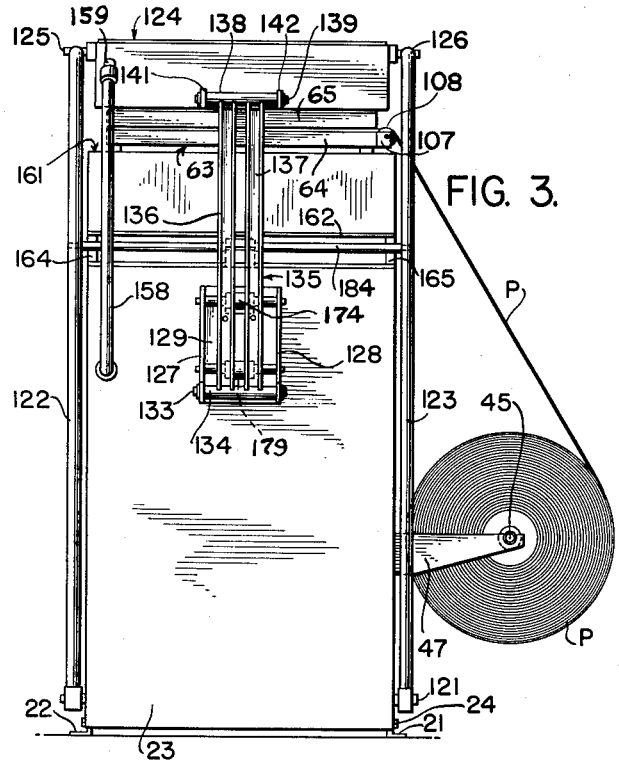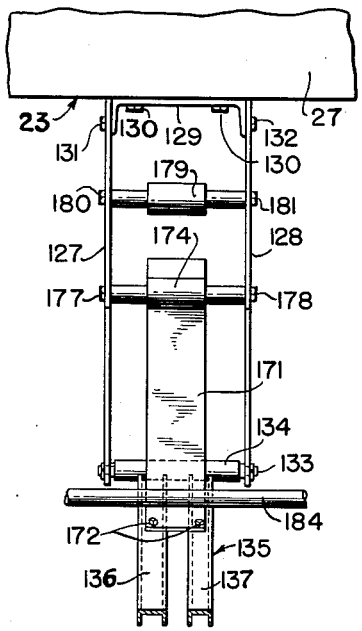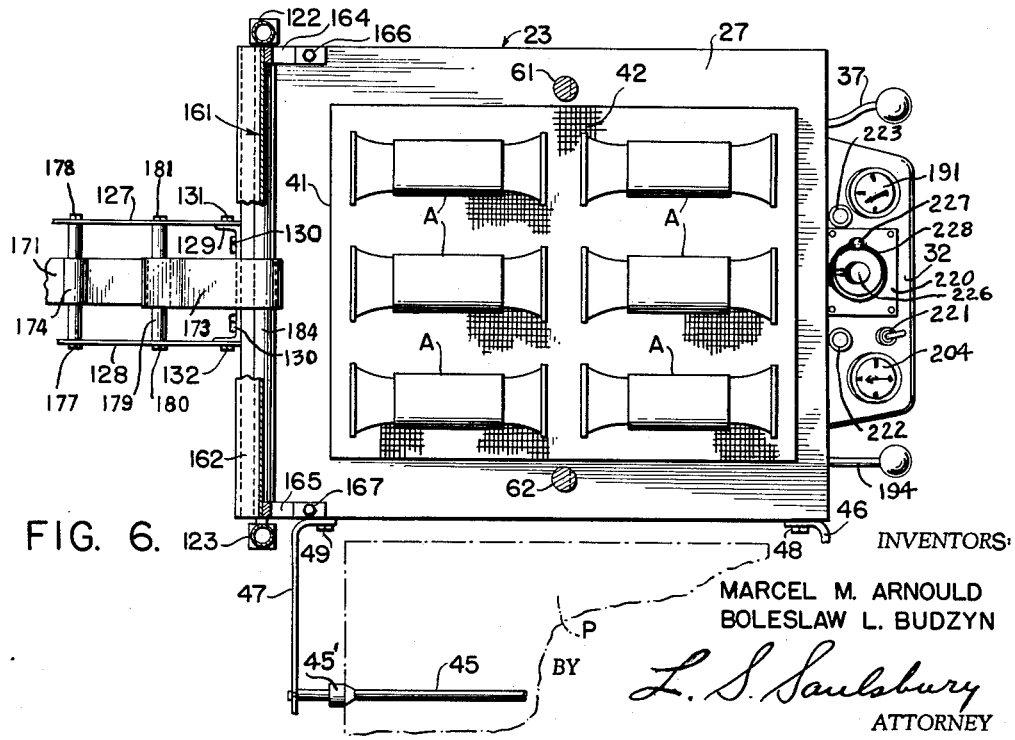

May 19, 1964 M. M. ARNOULD ETAL 3,133,314
PLASTIC SHEET VACUUM FORMING MACHINE
Filed March 17, 1961 6 Sheets-Sheet 3

INVENTORS
MARCEL M. ARNOULD
BOLESLAW L. BUDZYN
BY
ATTORNEY

May 19, 1964 M. M. ARNOULD ETAL 3,133,314
PLASTIC SHEET VACUUM FORMING MACHINE
Filed March 17, 1961 6 Sheets-Sheet 4

INVENTORS:
MARCEL M. ARNOULD
BOLESLAW L. BUDZYN
BY L. S. Saulsbury
ATTORNEY

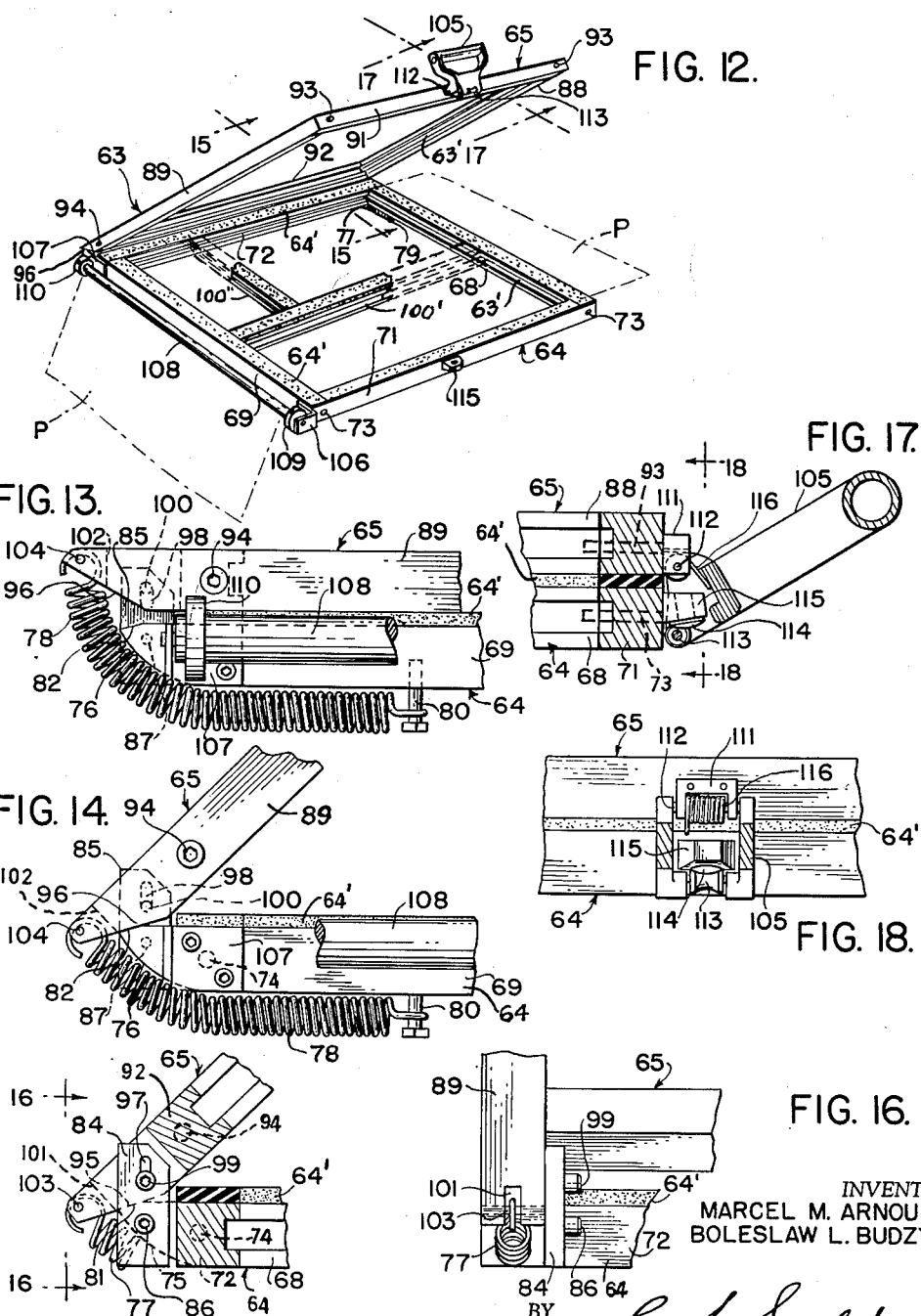

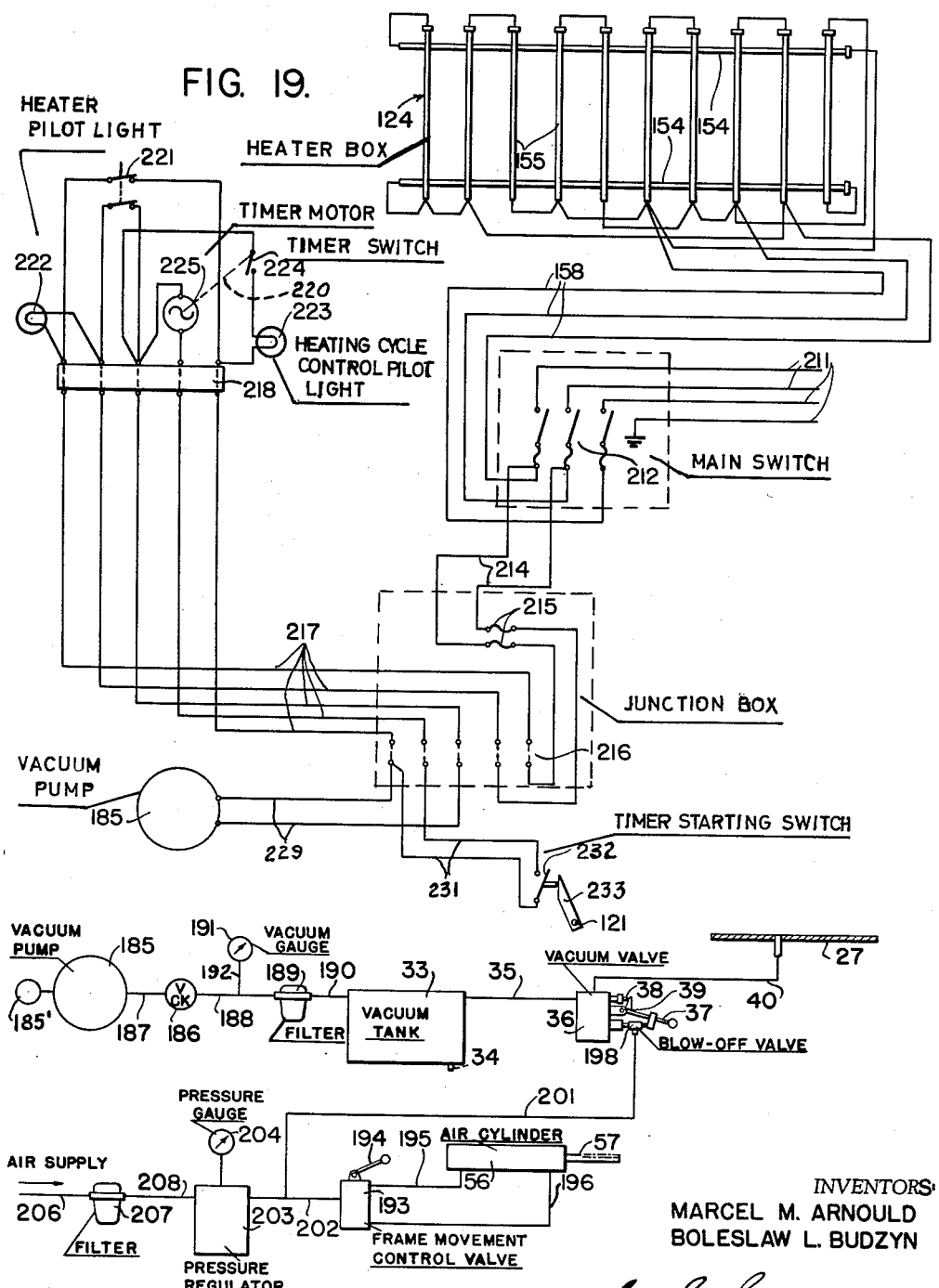

United States Patent Office 3,133,314
Patented May 19, 1964

3,133,314
PLASTIC SHEET VACUUM FORMING MACHINE
Marcel M. Arnould, East Orange, and Boleslaw L. Budzyn, Garfield, N.J. (both of 391 Mulberry St., Newark, N.J.)
Filed Mar. 17, 1961, Ser. No. 96,449
3 Claims. (Cl. 18—19)

This invention relates to a plastic sheet vacuum forming machine.

It is the principal object of the present invention to provide a vacuum-forming machine that can quickly produce from thermo-plastic sheet, packaging blisters, displays, three-dimensional letters, toys, and many other three-dimensional products and at low costs.

It is another object of the invention to provide a plastic-sheet, vacuum-forming machine that is self-contained with air, electric heater power vacuum pump, and all the controls for use therewith and the only need upon setting up the machine being to connect the machine to electric supply and air line sources.

It is still another object of the invention to provide a plastic sheet, vacuum-forming machine which requires no special training to operate the machine and from which satisfactory samples can be readily supplied.

It is a further object of the invention to provide a plastic-sheet, vacuum-forming machine that can be operated not only from single plastic sheets of various gauges but also from a roll of plastic sheet material disposed on the machine and trimmed from the roll after the shape has been formed as the heater is pulled forwardly to prepare the plastic sheet material for the next succeeding operation, this being done by a cutter depending from one side of the heater frame.

It is a further object of the invention to provide a plastic sheet, vacuum-forming machine with a plastic sheet retaining frame assembly that can be opened easily to receive the plastic sheet, easily locked closed upon the plastic sheet and firmly held while being heated, transferred and vacuum drawn, and which can be easily released to free the finished product.

It is a still further object of the invention to provide a plastic-sheet vacuum-forming machine with spring assisting and stop means for the heater whereby the pulling and return movements of the heater can be accomplished with a minimum of effort.

Other objects of the invention are to provide a plastic sheet vacuum-forming machine having the above objects in mind which is of simple construction, has a minimum number of parts, easily installed and adjusted for use, easy to operate, sturdy, of pleasing appearance, automatic upon instituting the various operations, efficient and effective in use.

Figure 9:
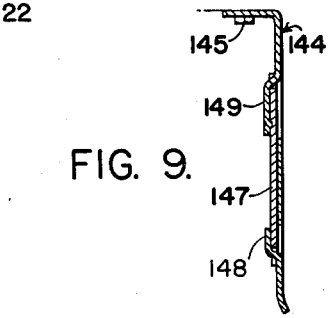
Figure 2:
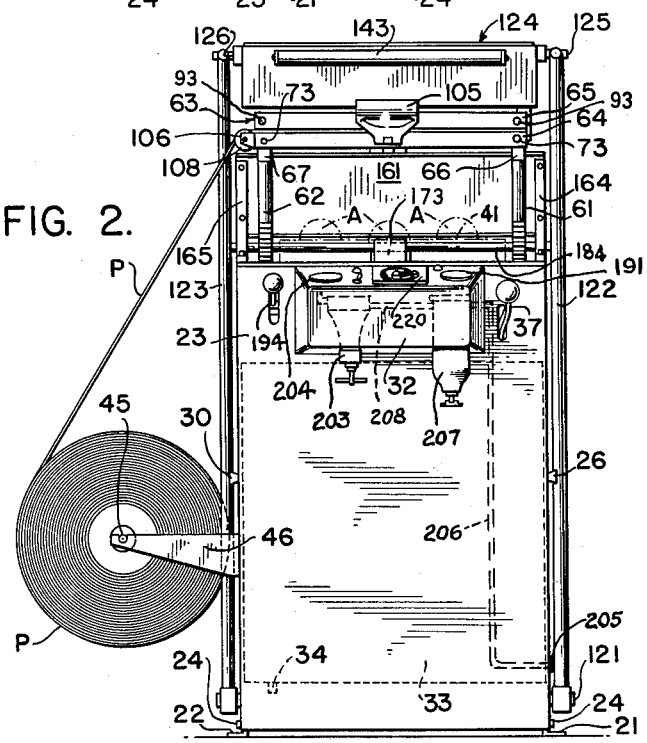
Figure 8:
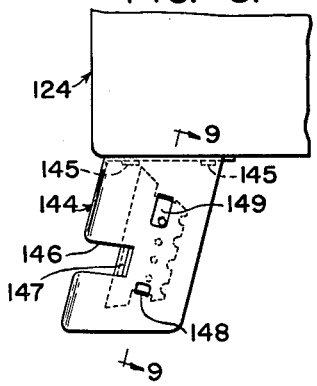
Figure 4:
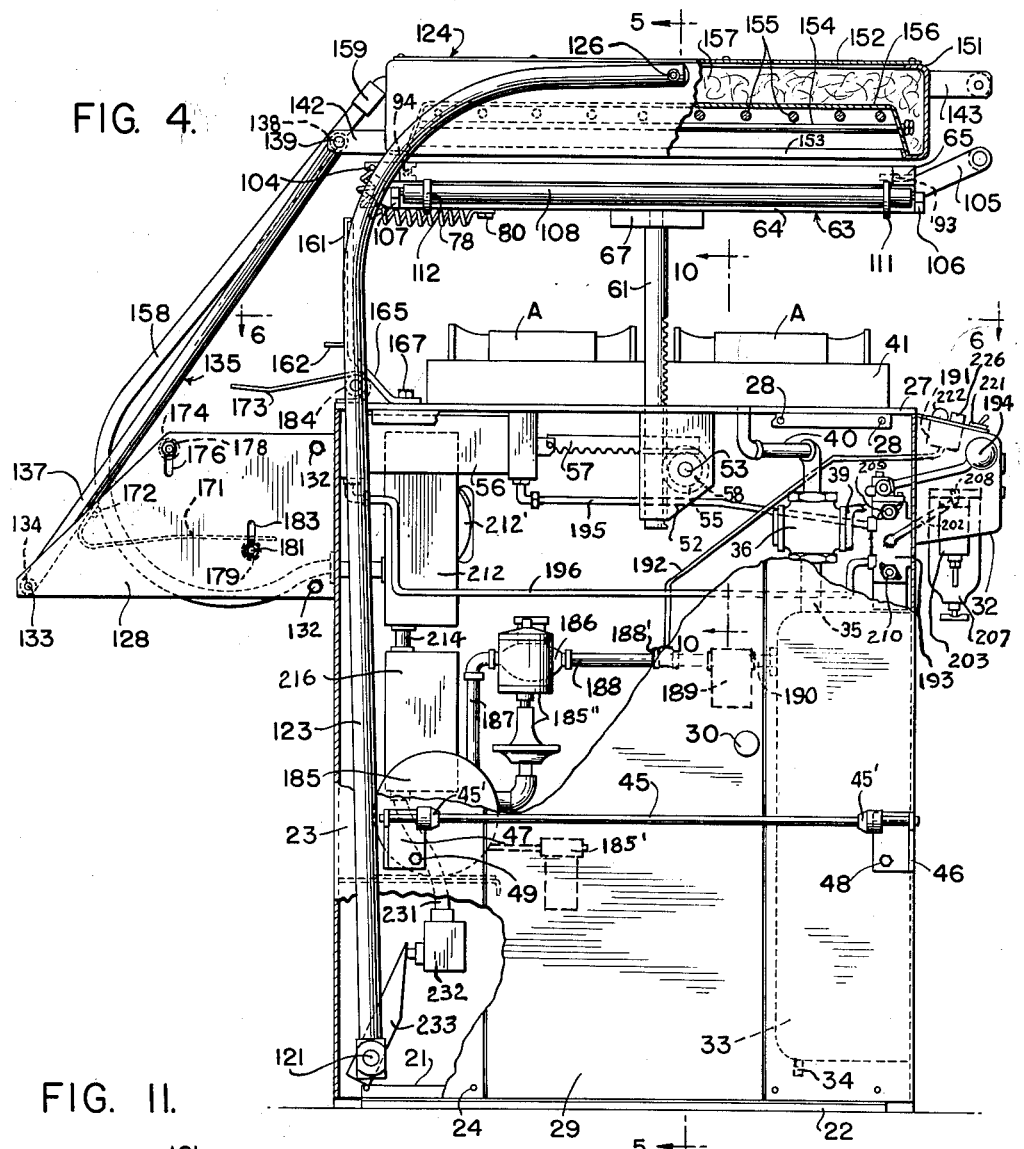
Figure 11:
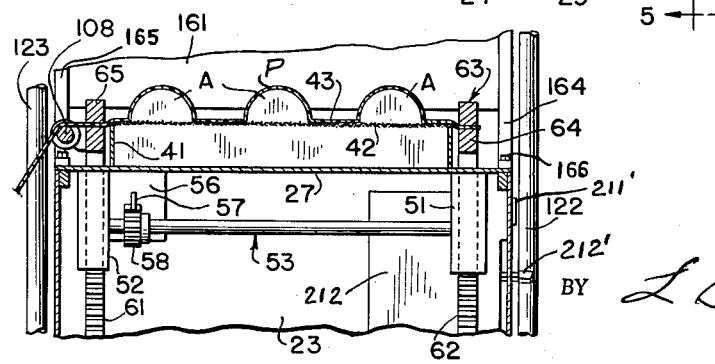
Figure 5:
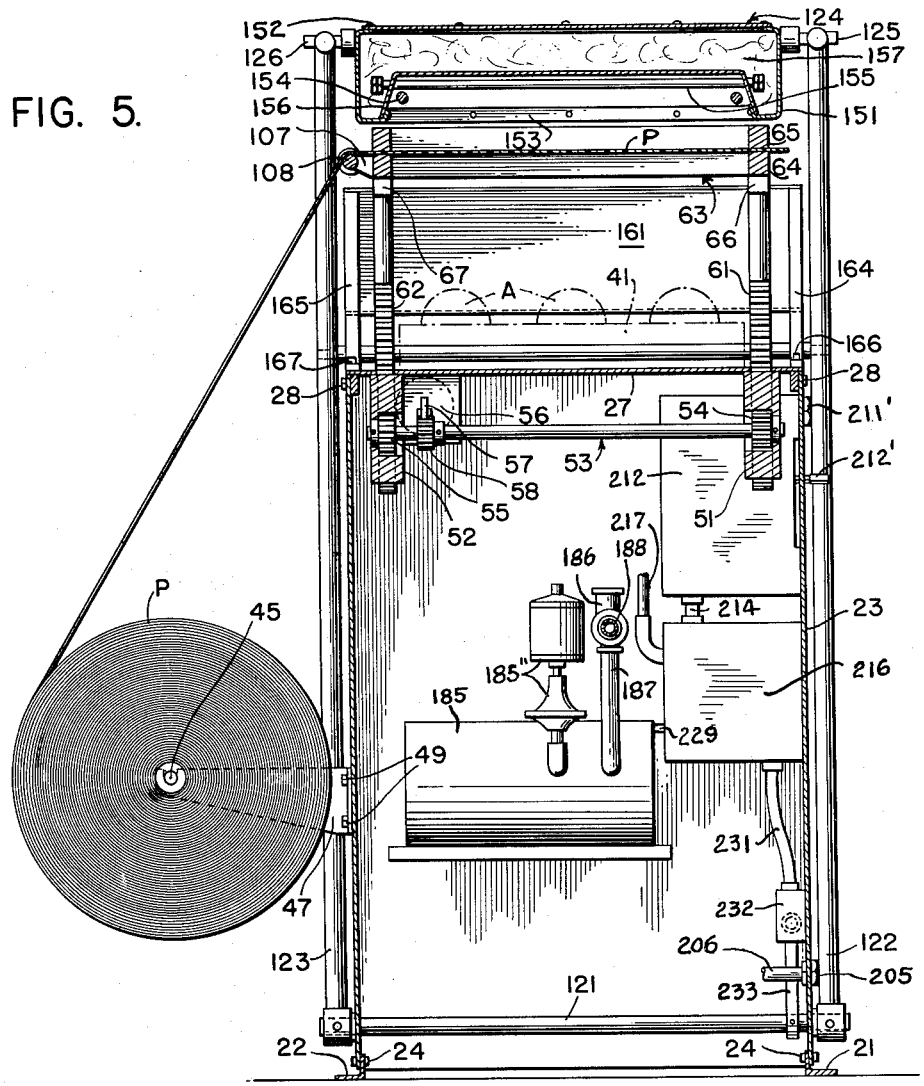
Figure 10:
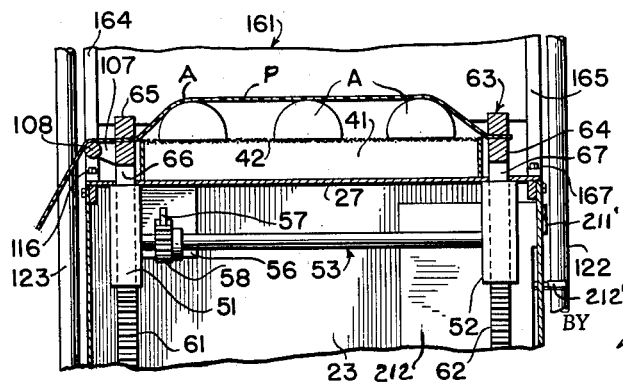

For still other objects and a better understanding of the invention, reference may be had to the following detailed description taken in connection with the accompanying drawing, in which FIGURE 1 is a right side elevational view of the present vacuum-forming machine with the heater assembly rearwardly retracted and the plastic sheet retaining frames elevated and retracted above the articles to be packaged and downward over which the plastic package sheet material is to be drawn, FIG. 2 is a front elevational view of this vacuum-forming machine with the plastic sheet retaining frames still elevated and the heater assembly retracted, FIG. 3 is a rear elevational view of this vacuum-forming machine, FIG. 4 is an enlarged left side elevational view of this machine with the heater assembly extended over the elevated plastic sheet retaining frames to effect the heating of the plastic prior to its being vacuum drawn over the articles being packaged and with portions of the casing broken away to show the interior parts thereof, and with the plastic sheet roll having been removed from the side of the machine, FIG. 5 is a vertical sectional view of the vacuum-forming machine as viewed on line 5—5 of FIG. 4, FIG. 6 is an enlarged fragmentary transverse sectional view of the vacuum-forming machine looking in plan upon the articles over which the plastic sheet is drawn and the control housing, and as viewed generally on line 6—6 of FIG. 4, FIG. 7 is a fragmentary plan view of the heater assembly spring supporting and balancing device and as viewed on line 7—7 of FIG. 1, FIG. 8 is an enlarged fragmentary side elevational view of the heater assembly and particularly of the plastic sheet blade cutter or slicer depending therefrom, FIG. 9 is a vertical sectional view of the plastic sheet blade cutter shown in FIG. 8 as viewed on line 9—9 thereof, FIG. 10 is a fragmentary vertical sectional view of the frames of the heated plastic sheet retaining frames drawn down over the articles to be covered or packaged with the drawn sheet, preparatory to the evacuation of the space thereunder and vacuum drawing of the plastic sheet, the view being taken generally on line 10—10 of FIG. 4, FIG. 11 is a vertical sectional view similar to FIG. 10 after the vacuum operation has been performed and the plastic sheet drawn finally about the articles, FIG. 12 is a perspective view of the plastic sheet retaining frames with the upper frame hinged upwardly to permit the placing of the plastic sheet between the frames, FIG. 13 is an enlarged fragmentary side end elevational view taken at the rear end of the frames with the frames closed and the lifting spring for the upper frame extended, FIG. 14 is an enlarged fragmentary side elevational view similar to FIG. 13 but with the upper frame hinged upwardly by the tension springs.

FIG. 15 is a fragmentary longitudinal sectional view taken through the rear of the retaining frames as viewed generally on lines 15—15 of FIG. 12, FIG. 16 is a fragmentary rear elevational view of the hinged retaining frames as viewed generally on line 16—16 of FIG. 15, FIG. 17 is an enlarged fragmentary longitudinal sectional view of the trip latch handle carried on the upper frame and in engagement with the catch of the lower frame to hold the upper frame closed on the lower frame against the action of the rear tension springs, FIG. 18 is a vertical sectional view taken through the trip catch latch handle as viewed on line 18—18 of FIG. 17, FIG. 19 is the wiring diagram for the machine, and FIG. 20 is a diagrammatic layout of the vacuum pump and air supplying system.

Referring now to the figures, 21 and 22 represent respectively right and left hand foot supports to which a box-like casing 23 is attached by fastening screws 24. In the right side wall, is a door 25 with a handle 26 by which the door can be hinged open to provide access to the interior of the casing 23, FIG. 1. A top plate 27 is fastened to the top of the casing 23 by fastening bolts 28. In the left side wall of the casing, FIG. 4, is another door 29 opened by a handle 30 to provide access to the interior of the casing 23 at the left side thereof. These doors 25 and 29 extend upwardly throughout the full height of the casing 23.

Projecting outwardly from the front of the casing 23 is a control housing 32 before which the operator stands to operate the machine. Extending inwardly from the front of the casing and carried thereon, is a vacuum tank 33 that is maintained under vacuum ready for use by a vacuum pump in a manner to be later set forth. A drain plug 34 is provided in the bottom of the tank 33 that can be removed to flush the tank. Leading from the vacuum tank 33, is a pipe 35 that has a vacuum control valve 36 with a control hand lever 37 extending outwardly through the right front of the casing 23 and when depressed actuates a valve stem 38 extending from the valve 36, FIGS. 1, 2, 4, 6 and 20. The control hand lever 37 is pivoted upon a bracket 39 on the valve 36. Extending from the valve 36, is a pipe line 40 that extends through the casing top plate 27 so as to draw a vacuum from a box structure 41 having a screen mesh top 42 and resting upon the top plate 27.

Articles A, about which thin plastic sheet material P is then to be drawn, are placed upon the mesh screen top 42, the number of them depending upon the size of the article. This plastic sheet P can be taken from a roll supported on the left side of the machine by a support rod 45 having opposite end plugs 45′. This rod is removably carried on brackets 46 and 47 that are secured respectively to the left side of the casing 23 by respective fastening bolts 48 and 49, FIGS. 2, 4, 5 and 6.

Fixed to and depending from the underside of the top plate 27 are respective right hand and left hand bearing blocks 51 and 52 that rotatably support a gear shaft assembly 53 having right and left hand rack gear pinions 54 and 55 lying respectively in the bearing blocks 51 and 52, FIG. 5. This gear shaft assembly 53 is rotated by a two-way air-operated cylinder device 56 that has an operating gear rack 57 meshing with a pinion gear 58 on the gear shaft assembly 53. Compressed air is supplied to the opposite ends of the air-operated cylinder device 56 to work the device in a manner to be later set forth.

Depending downwardly through the top plate 27 of the casing 23 and the respective bearing blocks 51 and 52 are rack lift rods 61 and 62 that are worked in unison by the gear shaft assembly 53, FIG. 5. Extending between the upper ends of these rack lift rods 61 and 62 to be vertically-adjusted thereby is a plastic sheet retaining frame assembly indicated generally at 63 that comprises a bottom frame 64 and a top frame 65 hinged to the bottom frame 64 at the rear of the assembly in a manner to be soon described. Fixed to the underside of the bottom frame 64 are respective boss plates 66 and 67 into which reduced ends of the respective lift rods 61 and 62 are extended to provide a rigid connection of the rods with the bottom frame 64.

The bottom frame 64 of the plastic sheet retaining frame assembly 63 is formed of right and left side frame pieces 68 and 69, FIGS. 12 to 18, and front and rear frame pieces 71 and 72 joining the side pieces together and made secure to the ends thereof by front and rear fastening screws 73 and 74. The front piece 71 extends across the forward ends of the side frame pieces while rear frame piece 72 extends between the inner edges of the side frame pieces. The rear ends of the side frame pieces 68 and 69 extend rearwardly beyond the rear frame piece 72 and have their underedges rounded as indicated respectively at 75 and 76, FIGS. 13, 14 and 15 to accommodate respectively longitudinally-extending top frame lift assister springs 77 and 78 respectively anchored to the undersides of the side frame pieces 68 and 69 by respective screw bolts 79 and 80 that can be fixed to any one of a series of adjusting holes or the side frame pieces depending upon the amount of lift desired of the springs. The rounded rear ends of the side frame pieces 68 and 69 respectively have top stop surfaces 81 and 82 and respectively secured thereto are respective vertically-extending hinge plates 84 and 85 by means of respective fastening screws 86 and 87, FIGS. 13, 14 and 15. These hinge plates 84 and 85 extend upwardly from the bottom frame for pivotal securement thereto of the top frame 65.

The top frame 65 of the plastic sheet retaining assembly 63 is formed of side frame pieces 88 and 89 and front and rear frame pieces 91 and 92 secured together by front and rear fastening screws 93 and 94 and in a similar manner that the bottom frame pieces are secured together. The rear ends of the side frame pieces 88 and 89 extend rearwardly beyond the rear frame piece 92 and over the rear ends of the side frame pieces 68 and 69 of the bottom frame 64. They respectively have rearwardly and upwardly inclined stop surfaces 95 and 96 adapted to engage respectively the oppositely inclined stop surfaces 81 and 82 on the rear ends of the side frame pieces 68 and 69 of the bottom frame 64 as the top frame 65 is hinged upwardly under the action of the assister springs 77 and 78. The raising of the top frame permits the thin plastic sheet 43 to be drawn from the plastic sheet roll P and extended between the two plastic sheet retaining assembly frames 64 and 65. The upper face of the bottom frame 64 is lined with rubber-like strips 64′ to tightly retain the plastic sheet P when the top frame 65 is closed over the plastic sheet and onto the bottom frame 64. In order that the thickness of the plastic sheet material may be varied and the frames be accommodated thereto, the securement of the top frame 65 with the upstanding hinge plates 84 and 85 is effected by means of vertically-extending elongated slots 97 and 98 in the hinge plates in which can be vertically adjusted respective hinge screw pins 99 and 100 fixed to rear ends of the side frame pieces 88 and 89 of the top frame 65, FIGS. 13, 14 and 15.

The bottom and top frames 64 and 65 are provided with internal side grooves for receiving an internal frame member 100′ to divide the frames into smaller areas and adapt them for use upon articles that do not require large size plastic sheet P, FIG. 12. The large width plastic sheet roll can be replaced by a roll of plastic sheet of smaller width. The internal frame member can also be extended fore and aft and can be matched with other frame members 100″ similarly constructed but of shorter length to be extended between the internal frame member 100′ and other internal frame members 100′ or between a frame member 100′ and the sides of the bottom and top frames 64 and 65. These frame members are all retained by a tongue on the end of them that fits into the internal groove 63′ surrounding the top and bottom frames. These members 100′ and 100″ can also be covered with rubber-like strips 64′ to tightly retain the plastic sheet when disposed between the closed bottom and top frames.

The rear ends of the side frame pieces 88 and 89 of the top frame 65 are respectively vertically slotted as indicated at 101 and 102, FIGS. 15 and 16, into which the ends of spring assisters 77 and 78 are respectively extended and retained by respective anchor pins 103 and 104. As the top frame 65 is released from the bottom frame 64, the assister springs 77 and 78 will effect a maximum pull at the beginning of the movement thereby overcoming the weight of the top frame and will continue to lift the frame without muscular aid of the operator and until the inclined stop surfaces 95 and 96 on the top frame engage the stop surfaces 81 and 82 of the bottom frame 64. The amount of the lift is sufficient to make easy the insertion of the plastic sheet P into the frame assembly between the frames thereof. The top frame 65 is easily lowered against action of the springs by grasping a handle 105 and pulling downwardly, the leverage action being so great as to easily overcome the resistance of the assister springs 77 and 78.

Upon the left side of the bottom frame 64 and at the front and rear thereof, outwardly-extending brackets 107 and 108 are secured to the side frame piece 69 in which the opposite ends of a plastic sheet guide roller 108 are respectively journalled. On the guide roller 108, are adjustable guide rings 109 and 110 to guide the side edge of different size plastic sheet P as it is taken from the roll. They can be adjusted from the opposite ends of the roller along the same to accommodate the different widths of the plastic sheet and held in their adjusted position by a screw. The plastic sheet P is drawn upwardly from the sheet roll and over the roller 108 and across the lower frame to the opposite side thereof and then clamped in place against the rubber strips 64 as the top frame 65 is brought downwardly thereover.

The top frame handle 105 is pivotally connected to a boss projection 111, secured to the front frame piece 91 of the top frame 65, FIGS. 12, 17 and 18, by a horizontal pivot pin 112 and has a horizontally-extending catch roller 113 that is engageable with a rounded bolt head 114 depending from the underside of a catch projection 115 on the bottom frame 64 as the handle is brought downwardly home so as to lock the frames together. A torsion coil spring 116 is carried on the pivot pin 112 and reacts between the boss projection 111 and the handle 105 to bias the handle to an upright position, upon the top frame 65 when free of the catch head 114.

Extending across the bottom and rear of the casing 23 and through the sides thereof, is a shaft support 121 to the outer ends of which are fixed right and left hand upwardly-extending and forwardly-bowed front heater supporting arms 122 and 123 that support an overhead heater box 124 that serves to heat the plastic sheet. These supporting arms are connected to the sides of the heater intermediate its length by pivot pin connections 125 and 126 respectively so that the heater box may tilt fore and aft and be kept level horizontally as the heater box is moved forwardly and rearwardly to overlie the plastic sheet P that is held in the plastic sheet-retaining frame assembly 63.

Extending rearwardly from the casing 23 are right and left rear arm supports 127 and 128, FIGS. 1, 3, 4, 6 and 7, that are connected to the casing 23 by a vertically-extending channel bracket 129 and fastening screws 130, the arm supports 127 and 128 being respectively fastened to the channel bracket 129 by respective fastening screws 131 and 132. Extending between and through the rearwardmost ends of the rearwardly-extending rear arm supports 127 and 128 is a pivot pin 133 on which a sleeve 134 is journalled and from which there rigidly extends a rear heater supporting arm assembly 135. This heater supporting arm assembly 135 is formed of two parallel right and left channel members 136 and 137 rigidly welded or fixed to the sleeve 134. A sleeve 138 is welded or fixed to the upper ends of the arm members 136 and 137 that is in turn connected by a pivot pin 139 to the outer ends of laterally-spaced bracket arms 141 and 142 extending rearwardly from the heater box 124. This rear heater supporting arm assembly 135 is shorter than the front supporting arms 122 and 123 and will tend to keep the heater box 124 substantially horizontal while it is being moved fore and aft. The operator grasps handle 143 on the front face of the heater 124 and pulls the heater forwardly from the position shown in FIG. 1 to the position shown in FIG. 4 where it heats and softens the plastic sheet.

Depending from the right hand forward corner of the heater box 124 is a knife blade device 144, FIGS. 1, 8 and 9, for cutting the plastic sheet, the same being fixed by fastening bolts 145. This knife blade device has a cutaway opening 146 extending rearwardly from its forward edge to receive the plastic sheet 43 and to guide the sheet against a vertically-extending knife blade 147 that is detachably held over the sides of the opening by vertically-spaced inwardly-struck portions 148 and 149. Accordingly, when the plastic sheet material P held between the bottom and top frames 64 and 65 of the plastic sheet retaining frame assembly 63 and the assembly is elevated the plastic sheet 43 is sheared or trimmed as the heater box 124 is pulled forwardly by the operator. The knife blade device is run along the right side of the assembly 63. The plastic sheet that has been vacuum drawn over the several articles A and released therefrom by blowing in a manner later to be described can be moved along to the right pulling another plastic sheet from the plastic roll so that a new plastic sheet P is placed and clamped in the retaining frame assembly 63 for the next vacuum drawing operation. When the heater box 124 is next pulled forwardly to heat the new plastic sheet P, the previously drawn and formed sheet P is automatically cut and severed from the new plastic sheet P by the depending knife blade device 144. These operations may be continued in this manner until the desired number of formed sheets P have been obtained.

The heater box 124 comprises generally a rectangular-shaped sheet metal frame 151, FIGS. 4 and 5, and a removable top cover 152 closing the top of the frame 151. The bottom of the heater box 124 is left open as indicated at 153 so that heat rays can be imparted to the plastic sheet P from longitudinal and transversely-extending heater rods or elements 154 and 155 carried in an upwardly-indented reflector 156 that is supported within the bottom of the frame 151 and overlying the opening 153. These heater rods are wired within the heater frame 151 and about the reflector 156 and within a heat insulating mass 157. The heater rods are supplied with electric current by a three-wire cable 158 extending upwardly from the rear of the casing 23 to the rear of the heater box 124 and run thereinto through a fitting 159 fixed to the rear of the heater box 124. The wiring of the heater rods 154 and 155 within the heater box 124 is in series-parallel relationship as best seen in FIG. 19.

To shield the plastic sheet against heat from the heater 124 when the heater is retracted rearwardly, an upwardly-extending metal shield plate structure 161 is supported on the rear of the top plate 27 of the casting 23. This heat shield plate structure 161 has a rearwardly bent reinforcing flange 162 extending along its lower edge and upstanding right and left hand brackets 164 and 165 that are fixed to the top plate 27 by respective fastening screws 166 and 167, FIGS. 1, 2, 4 and 5. This shield structure 161 extends upwardly sufficiently to reflect the heat from the plastic sheet when the heater is retracted to the rear position and without interfering with the fore and aft movement of the heater box 124.

To cushion the movement of the heater box 124 as it is moved to its forward or rear retracted position, a flat movement-resisting spring 171 is fixed to the heater rear arm assembly 135 by screw bolts 172 and a flat catch spring 173 is fixed to the top plate 27 of the casing 23, FIGS. 1, 4 and 7. The flat spring 171 is curved downwardly and forwardly and engages an upper stop roller 174 fixed between rear heater arm supports 127 and 128 when the heater 124 is in its retracted position as shown in FIG. 1, causing the flat spring 171 to be bowed under the weight of the heater. The flat spring 171 will carry the weight of the heater box 124 and will give up some energy to assist the initial pull forwardly of the heater box.

The upper stop roller 174 can be adjusted to different heights and settings in vertically-extending elongated slots 175 and 176 in the respective spaced heater arm supports 127 and 129 and made secure thereagainst by respective screw bolts 177 and 178 that are tightened to fix the ends of stop roller 174 to the arm supports, FIG. 7.

When the heater 124 is pulled forwardly over the plastic sheet P that is clamped in the retaining frame assembly 63 and with the frame assembly elevated as shown in FIG. 4, this flat movement-resisting spring 171 engages a lower and forwardly-spaced stop roller 179 placing cushioning resistance in the spring 171 to limit the forward fall and at the same time to build up a certain amount of spring power to assist the return of the heater to its retracted rear position. This stop roller 179 is retained between the rearwardly-extending rear arm supports 127 and 128 by respective bolts 180 and 181 that extend through vertically-extending elongated slots 182 and 183 to permit the roller 179 to be vertically-adjusted to provide the proper cushioning action of the flat spring 171.

The heater box 124 will also have been resisted in its forward movement by the flat stop catch spring 173 being engaged by transverse rod 184 extending between the front heater support arms 122 and 123 and to finally stop the forward movement of the heater box 124 upon the transverse rod 180 entering the rounded closed end of the catch spring 173. The catch spring 173 is sufficiently long to also resist the rearward movement of the heater by engagement of the transverse rod 184 therewith while the spring 171 on the rear arm assembly 135 is being transferred from the lower stop roller 179 to the upper stop roller 174. The rearward movement of the heater box 124 is thus limited by the engagement of the transverse rod 184 with the rear arm assembly 135 upon the rear assembly 135 passing over center and retained in its rear retracted position under the weight of the heater box 124, FIGS. 1 and 7. Power is built up in the flat spring 171 at both the forward and rear positions of the heater to assist in the reverse movements of the heater toward the opposite positions. Thus, these springs 171 and 173 not only serve to cushion the movement of the heater 124 but also to assist its movement forwardly and rearwardly so that little effort of the operator beyond the movement of the heater through an over center point is required to move the heater 124 either forwardly or rearwardly to its forward or rear position.

The various operating equipment will now be described. It should be understood that the machine is self-contained and to install the machine requires only the connection of the machine to electric power and air pressure supply lines. An electrically-driven vacuum pump 185 is operated to draw air from the vacuum tank 33 by the vacuum pump working through a check valve 186 to which the vacuum pump 185 is connected from a pipe 187. From the check valve 186, there extends a pipe 188 that is connected to an air filter 189 which, in turn, is connected by a pipe 190, FIGS. 4, 5 and 20. The vacuum pump 185 has an exhaust valve and muffler 185′ through which the air is finally exhausted and an oil lubricator 185″ to lubricate the pump.

The vacuum tank 33 as above described is connected by a pipe 35 to the combined vacuum and blow off valve 36 that is operated by the control hand lever 37 that extends through the front of the casing 23 at the right side thereof. The hand lever 37 is pressed downwardly to cause the air to be evacuated from the box structure 41 through the pipe 40 which is connected to the top plate 27, the valve 36 and pipe 35 to draw the vacuum from the box structure 41 and the plastic sheet P about the articles A over which the heated plastic sheet P has been extended, FIG. 11. This same hand lever 37 is pulled upwardly after the heated plastic sheet P has been drawn downwardly over the edges of the box structure 32 and the articles A to cause air under pressure to pass the valve 36 and the pipe 40 and effect the lifting and removal of the plastic forms from the articles A, the air being supplied from an air pressure supply system that will be later described. Thereafter the plastic sheet with the form in it is drawn to the right and cut from the plastic sheet roll by knife device 144 depending from the heater box 124 on its next forward movement thereof. In order that the vacuum pressure of the vacuum tank may be observed, a vacuum gauge 191 is provided in the top of the front control housing 32 and is topped by a small pipe line 192 and a T-fitting 188′ to the vacuum line 188, FIGS. 4 and 5.

Before the vacuum has acted upon the plastic sheet P, the frame assembly 63 containing the plastic sheet has been drawn downwardly by the actuation of the two way air-operated cylinder device 56. The cylinder device 56 causes its rack 57 to rotate the gear shaft assembly 53 and the vertically-extending rack lift rods 61 and 62 in the manner above described. At the left side of the machine is a frame movement control air valve 193 operated by a handle 194 projecting through the front of the casing 23, which, when depressed causes the frame 63 to be moved downwardly taking with it the heated plastic sheet, pulling and stretching the plastic sheet P downwardly over the articles A and the vacuum box structure 41, FIG. 10, while the frame assembly 63 and the plastic sheet P is held down by the frame control valve handle 194, the hand lever 37 of the vacuum control valve 36 is depressed to draw the vacuum and cause the plastic sheet P to be drawn about the articles A, FIG. 11. The frame movement control valve 193 is two-way and is connected to opposite ends of the air-operated cylinder device 56 by pipes 195 and 196, FIG. 4, to supply and exhaust air from the opposite ends of the cylinder device 56.

After the vacuuming operation has taken place, the frame assembly 63 is held down while the blowing action is effected upon the plastic sheet forms by the depressing of the hand lever 37 to open blow-off valve 198 on the vacuum valve 36 that is supplied from a pipe line 201, FIGS. 1 and 20, connected to a pipe 202 extending between a pressure regulator 203 and the frame movement control valve 193. An air pressure gauge 204 is connected to the air pressure regulator 203 and lies in the top of the control housing 32. Air under pressure is supplied to the right side of the machine through an air inlet fitting 205 and passes through a pipe 206 to an air filter 207 and a pipe 208 to the air pressure regulator 203. While the blowing with air pressure is being effected the frame control valve handle 194 will be edged upwardly to lift the frame assembly 63 and the plastic sheet forms from the articles A and the vacuum box structure 41. The speed at which the plastic sheet frame assembly 63 will be lifted and lowered can be adjusted by throttle valves 209 and 210 on the frame movement control valve 193. The throttle valve 209 varies the upward lift speed of the plastic sheet assembly 63 while the throttle valve 210 varies the lowering speed, FIG. 4. The heater box 124 will have been returned rearwardly by the operator and under the action of the springs of the support arm assembly therefor.

This machine is supplied with a three-phase two hundred and twenty volt electric current which can be connected by a plug with a receptacle 211′ extending through casing 23 at the right side thereof. The plug receptacle 211′ extends to a main safety switch box 212 that has a handle 212′ that projects outwardly through a vertical slot 213 in the casing 23, FIGS. 1, 4, 5 and 19. From the safety heater switch box 212, the three wire cable 158 extends to the heater box 124 to supply the heater rods 154 and 155 in the manner above described. Thus, when the main switch 212 is closed as by throwing downwardly the switch handle 212′ at the right side of the machine the heater box 124 is supplied with electric current to provide the heat required to soften and condition the plastic sheet P as the heater box is drawn forwardly over the plastic sheet frame assembly 63 containing the plastic sheet P that is to be treated while the frame assembly 63 with the plastic sheet is still elevated. The heater is maintained in a hot condition and ready for use so long as the machine is to be used. The upwardly-extending metal plate structure 161 shields the heater from the plastic sheet while the heater is in its retracted and out of use position.

Extending from one phase of the safety switch 212 are cable wires 214, that are fused as indicated at 215 within a junction box 216 that has a fine wire cable 217 extending to a timer junction box 218, FIG. 19. Connected to the junction box 218, are electric timer 220, an "on" and "off," preferably toggle switch 221, a heater pilot light 222 and a timer operated light 223 which is operated by a timer switch 224 of the electric timer 220 depending upon the length of the heating cycle for which the plastic sheet is to be heated as when the heater box 124 is drawn forwardly over the plastic sheet P in the elevated frame assembly 63. The timer 220 has a timer motor 225 and a turn knob 226 is turned against a timer stop 227 and ring 228 that can be adjusted through three hundred and sixty degrees, or sixty seconds, FIG. 6.

When the main safety heater switch 212 is turned on the light 222 is lighted and will remain "on" as long as the machine is in use.

When the toggle switch 221 is closed electric current is supplied through cable wires 229 extending from the junction box 216 to run the vacuum pump 185.

As the heater frame 124 is pulled forwardly a micro switch 232 connected to junction box 216 by a two wire cable 231 is closed by an arm 233 extending upwardly from the shaft heater arms support 121 and turned as the heater 124 and the heater supporting arms 122 and 123 are pulled forwardly over the assembly 63 to heat the plastic sheet P. This starts the timer 220 running and at the end of the predetermined timing period the timer switch 224 is closed to "turn on" the timer heating cycle light 223 to indicate to the operator when the heater frame is to be released and returned to its retracted position. The timing period can be regulated after making a few trial runs. When the timer light has been turned "on" and the heater returned to its retracted position, the frame movement control valve handle 194 is depressed to lower the frame assembly and the plastic sheet P onto the vacuum box 41 and articles A, FIG. 10. Thereafter the valve handle 37 is depressed to cause the plastic sheet to be drawn by vacuum action about articles A. The plastic sheet P will immediately provide forms of the articles A and can be removed from the articles A by raising the handle 37 to blow the plastic forms and at the same time raising the handle 194 to cause the frame assembly 63 to be elevated. The lock handle 105 of the frame assembly 63 is lifted to disengage its catch roller from the rounded bolt head 114, FIG. 17, so that the upper frames 65 can be hinged upwardly from the lower frame 64 and allow the plastic sheet P to be released from the plastic frame assembly 63.

A fresh sheet of plastic is then pulled from the plastic sheet roll through the opened frame assembly 63 and the upper frame 65 lowered and connected by its handle 105 to the lower frame 64 to clamp the new plastic sheet in place preparatory to the next cycle of operation, FIG. 12. As the heater is again pulled forwardly the knife device 144 on the heater will sever the formed sheet containing the finished forms from the new plastic sheet. The entire cycle of operation is repeated in the above manner until the desired number of plastic forms have been obtained.

It should now be apparent that there has been provided a plastic sheet vacuum forming machine that can produce three-dimensional products at low cost, self-contained and need only to be connected to electric and air line supply sources, semi-automatic in operation and in which the manual operations require only minimum effort on the part of the operator, the heater box movement being spring balanced and assisted.

It will also be apparent that the plastic sheet material itself is always available from a plastic sheet roll mounted on the side of the machine and can be easily extended through the opened plastic sheet retaining frame assembly and in which the finished plastic forms are automatically severed from the new plastic sheet as the heater box is pulled forwardly to prepare the new plastic sheet for the next operation.

While various changes may be made in the detailed construction, it shall be understood that such changes shall be within the spirit and scope of the present invention as defined by the appended claims.

What is claimed is:

1. A plastic sheet vacuum forming machine comprising a frame and casing having a top plate, a vacuum box structure supported on the top plate for supporting articles over which the plastic sheet is to be drawn, valve-controlled vacuum pump means supported in the frame for evacuating the vacuum box structure, a vertically-adjustable plastic sheet retaining frame assembly overlying the top plate and the vacuum box structure, air-operated means for raising and lowering said plastic sheet retaining frame between elevated and lowered positions, a heater box for heating the plastic sheet when the retaining frame assembly is in its elevated position and arm means for supporting the heater box for fore and aft movement between rearward retracted and forward heating positions, said heater box in its forward position overlying the elevated plastic sheet frame to heat the plastic sheet preparatory to the lowering of the plastic sheet retaining frame assembly upon the articles and the vacuuming operation, and said arm means for supporting said heater box for fore and aft movement including long forward supporting arms pivotally connected to the sides of the heater box and pivotally connected to the supporting frame at the lower opposite sides thereof, rear arm supports extending rearwardly from the supporting frame, rear heater supporting arm means pivotally connected to the rear ends of the rearwardly extending arm supports and to the rear of the heater box structure, said forward and rear heater supporting arms being so connected to heater box as to retain the heater box substantially horizontal while being moved fore and aft on the front and rear supporting arms, and said rear arm supports having an upper stop member and a lower stop member forwardly of the upper stop member and extending therebetween, a flat movement-resisting and assisting spring fixed to the heater rear supporting arm means and projecting forwardly to engage the upper stop member and to limit and cushion the rearward movement of the heater box and engageable with lower stop member to limit and cushion the forward movement of the heater box.

2. A plastic sheet vacuum forming machine as defined in claim 1, and vertically-extending slot means in the rear arm supports for retaining the spring stop members whereby the cushioning and spring assisting force of the flat spring can be varied.

3. A plastic sheet vacuum forming machine as defined in claim 1, and a catch spring fixed to the rear of the top plate of the supporting frame and closed at its forward end, said heater supporting arm means having a transverse rod adapted to be received by the catch spring to limit forward movement of the heater box and to position it forwardly over the plastic sheet retaining assembly.

References Cited in the file of this patent

UNITED STATES PATENTS

| | | |
|---|---|---|
| 1,272,468 | Lewis | July 16, 1918 |
| 1,687,340 | Little | Oct. 9, 1928 |
| 2,179,692 | Fuchs | Nov. 14, 1939 |
| 2,282,423 | Kopitke | May 12, 1942 |
| 2,480,960 | Press | Sept. 6, 1949 |
| 2,521,388 | Maynard et al. | Sept. 5, 1950 |
| 2,814,074 | Butzko | Nov. 26, 1957 |
| 2,836,852 | Butzko | June 3, 1958 |
| 2,848,903 | Trombetta | Aug. 26, 1958 |
| 2,865,208 | Wacht | Dec. 23, 1958 |
| 2,907,069 | Butzko | Oct. 6, 1959 |
| 2,976,658 | Kostur | Mar. 28, 1961 |
| 3,025,566 | Kostur | Mar. 20, 1962 |

FOREIGN PATENTS

| | | |
|---|---|---|
| 1,158,122 | France | Jan. 13, 1958 |
| 1,187,197 | France | Mar. 2, 1959 |